ANTI-SHOPLIFTING AND SURVEILLANCE SYSTEM

Filed Oct. 19, 1967 2 Sheets-Sheet 1

INVENTOR.
JOHN E. JENNINGS
BY
Drummond & Cahill
ATTORNEYS

INVENTOR.
JOHN E. JENNINGS
BY
Drummond & Cahill
ATTORNEYS

United States Patent Office 3,535,442
Patented Oct. 20, 1970

3,535,442

ANTI-SHOPLIFTING AND SURVEILLANCE SYSTEM

John E. Jennings, 1221 E. Windsor Ave., Phoenix, Ariz. 85006

Filed Oct. 19, 1967, Ser. No. 676,476
Int. Cl. H01j *29/02*
U.S. Cl. 178—6.8 1 Claim

ABSTRACT OF THE DISCLOSURE

A system including a plurality of units, each including a housing for mounting a closed circuit television camera; the housing rotates and includes an aperture for the camera lens whereby a predetermined area may be observed. The housing is provided with a control unit for reversing the direction of rotation and a remote control unit permits manual operation for monitoring a selected television view. The system also incorporates units without television cameras which are operated for the psychological effect resulting therefrom and a programmed stopping unit is inserted in the system to intermittently stop units to give the impression of manal operaion.

The present invention pertains to anti-shoplifting devices, and more particularly, to a surveillance system for performing the combined functions of viewing selected areas of a store while providing psychological deterents to would-be shoplifters.

In most stores, such as department stores, the monetary loss attributable to shoplifting is very significant. A variety of schemes have been proposed to reduce the losses by theft by rendering more efficient the means of detecting shoplifting when it occurs. These schemes include such things as strategically placed observation stations, mirrors placed to reflect aisles or particular counters, closed circuit television cameras directed at specific areas, etc. These systems overlook the most successful loss-reducing factor pertaining to shoplifting: the deterrent value of an obvious and apparently "live" detection system operating in full view. Shoplifting occurs only when the theif feels that he is unobserved or that an observation system is either inoperative or unattended. Prior art surveillance systems permit the shoplifter to make an intelligent determination of the operativeness of the system or the attention being directed thereto by an operator, thus enabling him to choose an appropriate time to complete the theft.

It is therefore an object of the present invention to provide a surveillance system utilizing means to prevent shoplifting in addition to means for observing shoplifting when it occurs.

It is another object of the present invention to provide a means whereby closed circuit television may be utilized to observe selected wide areas of a store without revealing the area being observed.

It is still another object of the present invention to provide an anti-shoplifting and surveillance system that is made to operate in a very conspicuous manner and which is operable in a fashion to render it impossible to ascertain whether the system is operating remotely or automatically.

These and other objects of the present invention will become apparent to those skilled in the art as the description thereof proceeds.

Briefly, in accordance with the embodiment chosen for illustration, an anti-shoplifting and surveillance system is provided including a plurality of observation units, each unit including a housing rotatably supported on a shaft suspended from the ceiling. The housing includes a plurality of apertures and includes a mounting bracket for positioning a closed circuit television camera therein.

The camera is directed through a single aperture although it is impossible to ascertain from the exterior of the housing which apertaure, if any, is positioned in front of a camera and whether there is more than one camera. The housing includes a reversible motor including a sheave secured to the shaft thereof in engagement with a V-belt passing over a second sheave secured to the end of the non-rotating support shaft. Energization of the motor thus results in rotation of the housing. A motor reversing switch is mounted in the housing so that the motor is reversed at the end of each revolution.

The system also includes a remote control unit having a selector switch for selecting a predetermined surveillance unit which automatically disables the motor reversing switch and de-energizes the motor. The remote control unit includes a pair of switches for energizing the relay coils of relay switches in the surveillance unit to permit the surveillance unit to be rotated in the forward and reverse directions at the will of the operator. A programmed stop subsystem is connected to the selector switch of the remote control unit to automatically stop selected surveillance units at predetermined intervals and in a selected sequence to simulate manual operation of the surveillance units.

The present invention may more readily be described by reference to the accompanying drawings, in which.

Figures 1, 2:
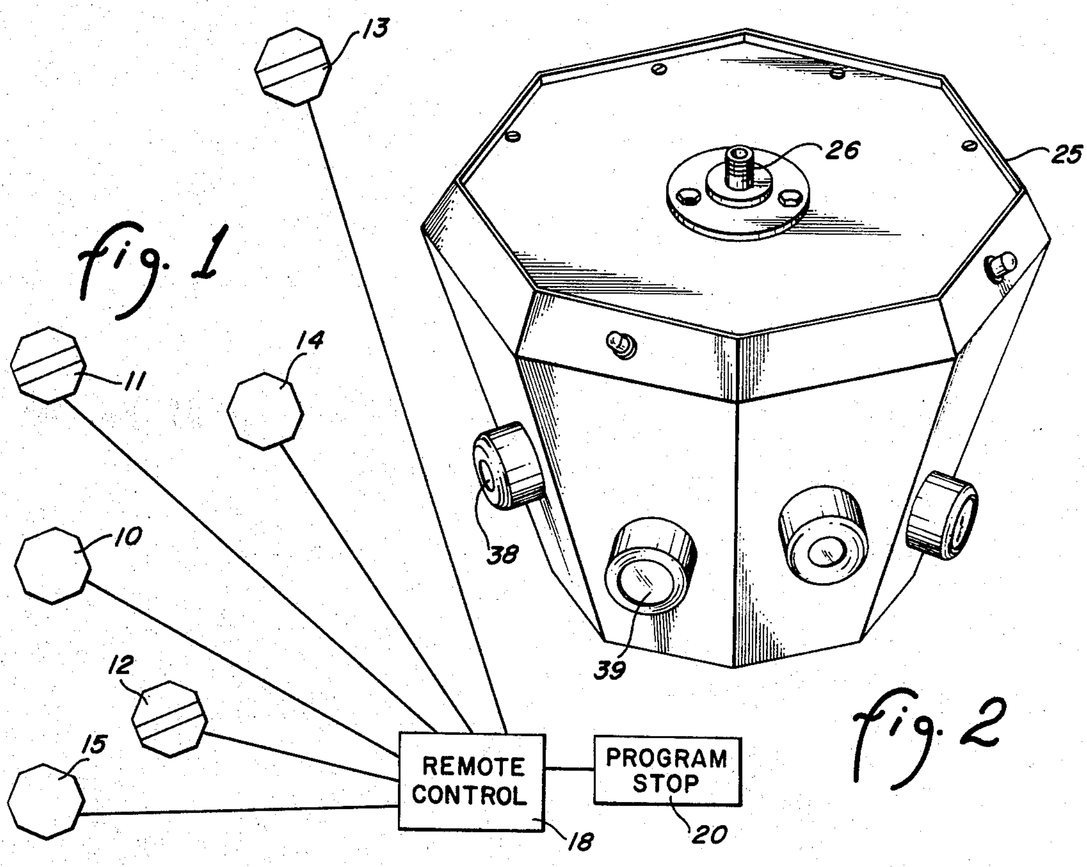
FIG. 1 is a schematic representation of an anti-shoplifting and surveillance system constructed in accordance with the teachings of the present invention showing the inter-relationship of the various units and the means for controlling thereof.
FIG. 2 is a perspective view of a surveillance unit used in the system of the present invention.

Referring now to FIG. 1, the present system contemplates the utilization of a plurality of surveillance units 10, some of which will contain operating closed circuit television cameras and others of which will simply be "dummy" units which have the outward appearance and actions of an operating unit. For example, surveillance units 11, 12, and 13 may be strategically located throughout a store for observing predetermined critical areas thereof; whereas, units 10, 14 and 15 may be dummy units which operate in all outward respects similar to units 11, 12, and 13, but which do not contain a television camera. Each of the surveillance units is connected to a remote control station 18 for controlling the actions of the surveillance units as will be described more fully hereinafter. A program stop subsystem 20 is connected through the remote control unit 18 to the surveillance units and will also be described in greater detail.

Figure 3:
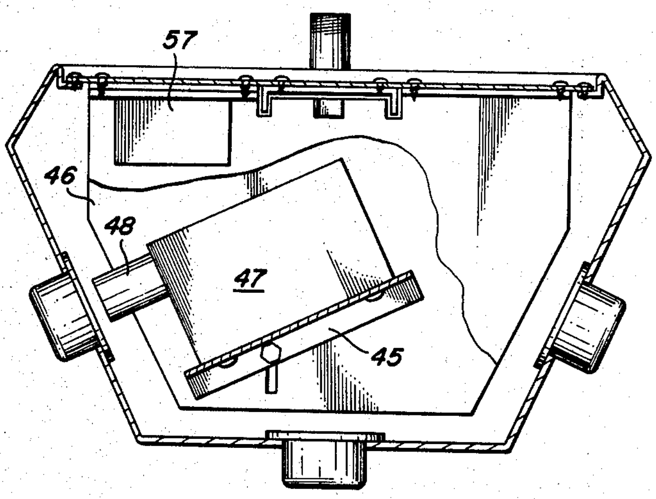
FIG. 3 is a side elevation, partly in section, of the surveillance unit of FIG. 2.
Figure 4:
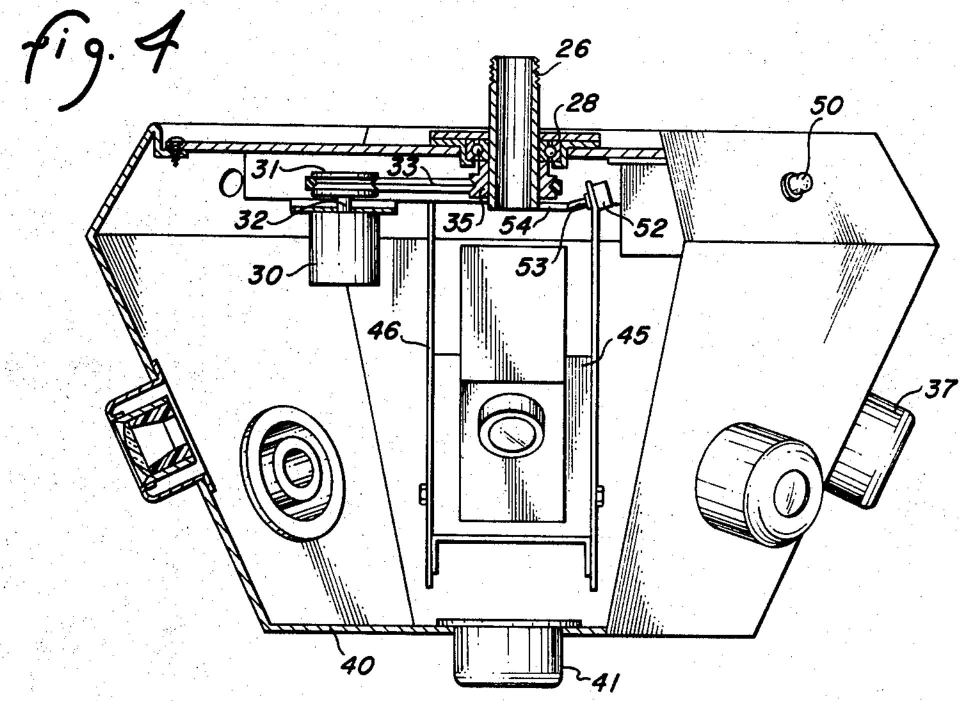
FIG. 4 is a side elevation of the surveillance unit of FIG. 2, partly in section, showing the reversible electric motor and reversing switch.

Referring now to FIGS. 2, 3, and 4, a surveillance unit is shown and may be seen to include a housing 25 rotatably mounted on a supporting shaft 26 which may, for example, depend from the ceiling of the store. A bearing 28 is provided to permit the housing to freely rotate and a reversible electric motor 30 is mounted in the housing to provide sufficient power for rotating the unit. Typically, the motor 30 may be a commercially available 1 r.p.m. unit and includes a sheave 31 mounted on the output shaft 32 of the motor for driving a V-belt 33 which passes over a second sheave 35 mounted at the end of the non-rotating shaft 26.

The housing 25 in the embodiment chosen for illustration, is tapered and of octagonal cross-section with each of the eight sides thereof, including an aperture 37. The apertures may be selected to have high resolution lens 38 or alternatively wide angle lens 39. The bottom panel 40 of the housing 25 may also include an aperture 41. A mounting bracket 45 is adjustably secured to a depending frame 46 secured to the interior of the housing for supporting the closed circuit television camera 47 having a lens system 48 aligned with a selected one of the apertures 37.

A plurality of red indicator lamps 50 are provided on the housing and are intermittently energized to periodically flash to subtly attract attention to the unit. A reversing switch 52 is mounted in the rotating housing and includes a toggle 53 which comes into contact with a toggling abutment 54 secured to the shaft 26 to cause the switch to reverse the energization of the motor 30 at the end of each rotation. A control box 57 is provided on the surveillance unit and contains the electric hardware for implementing the operational functions, as will be described later.

Figure 5:
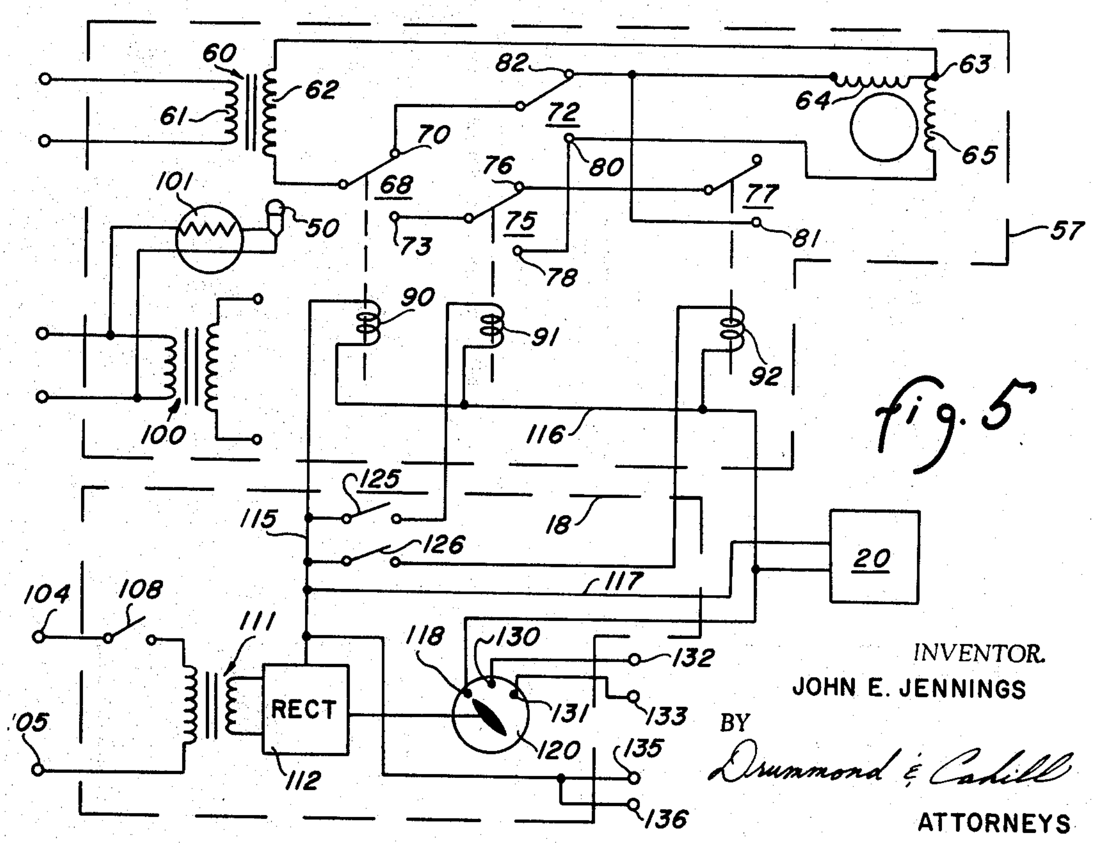
FIG. 5 is a schematic circuit diagram of a surveillance unit and its interconnection with the remote control unit and programmed stop of the system of the present invention.

Referring now to FIG. 5, the control box 57 is schematically shown in dotted lines and the remote control unit 18 is shown schematically by the second dashed enclosure. Similarly, the program stop subsystem 20 is shown connected to the remote control unit 18. Control box 57 includes a transformer 60 for receiving 24 volts AC at the primary 61 thereof and providing 110 volts AC at the secondary 62. It may be noted that all wiring entering the control box 57 and thus entering the surveillance unit is limited to 24 volts to obviate difficulties and expense arising from the utilization of 110-volt wiring and the complications arising from meeting electrical codes relating to the higher voltage. The secondary winding 62 is connected to the junction 63 between motor field windings 64 and 65. The other side of the secondary winding 62 is connected to a motor disabling switch 68. Terminal 70 of the switch 68 is connected to a reversing switch 72. Terminal 73 of the switch 68 is connected to a first directional switch 75. Terminal 76 of the switch 75 is connected to a second directional switch 77. Terminal 78 of the switch 75 is connected to the terminal 80 of the switch 72 which, in turn, is connected to the winding 65. Terminal 81 of the switch 77 is connected to the terminal 82 of the switch 72 which, in turn, is connected to the winding 64.

Switches 68, 75, and 77 are relay switches having relay coils 90, 91, and 92 respectively. The switches are also shown in their normal or rest position with the corresponding relay coil unenergized. A second transformer 100 is provided for transforming 24-volt to 110-volt power for supplying the television camera. The 24-volt side of the transformer 100 is utilized to operate red indicator lamps 50 which are caused to flash by a conventional flasher unit 101.

The remote control unit includes a pair of terminals 104 and 105 for connection to a conventional 110-volt AC source. An on-off switch 108 is provided to activate the unit which applies the 110-volt supply through a transformer 111 to a full wave rectifier 112; thus, the voltage is reduced from 110 to 24 and is rectified to provide 24-volt DC for operation. The output of the rectifier 112 is connected through conductor 115 through relay coil 90, conductor 116, conductor 117, to terminal 118 on a selector switch 120. Relay coil 91 is connected between conductors 115 and 116 through normally open, manually operated switch 125. Similarly, relay coil 92 is connected between conductors 115 and 116 through normally open, manually operated switch 126. Program stop subsystem 20 is connected between conductors 117 and 115 and may be any of a large variety of programmed operated switches. For example, the only requirement for the program stop subsystem is that it complete an electrical path between conductors 116 and 117 at predetermined desired intervals. Such devices as punched paper tape, magnetic tape, punched cards, or punched code discs may readily be used to close the circuit between conductors 116 and 117 at predetermined selected intervals. Although more complicated, a simple cam-operated switch may be used to accomplish the same function. The program stop subsystem 20 is connected into the remote control unit 18 as shown in FIG. 5 for each surveillance unit so that the respective surveillance units may be programed to be stopped at the selected intervals. The remote control unit 18 of FIG. 5 is shown connected to a single surveillance unit 57; selector switch 120 is provided with a plurality of terminals 130 and 131 connected to terminals 132 and 133 which may be connected to additional surveillance units in conjunction with the terminals 135 and 136. It will be obvious to those skilled in the art that any number of surveillance units may be utilized with a single control unit; however, it has been found that a convenient arrangement is to utilize a single remote control unit 18 and program stop subsystem 20 with ten surveillance units.

The operation of the system of the present invention may now be described. The surveillance units are rotatably mounted at the desired locations in a store and those units containing operating closed circuit television cameras are placed in the strategic locations requiring surveillance. The surveillance units are energized and slowly rotate (1 r.p.m.) while the indicator lights 50 automatically turn on and off to attract attention to the fact that the units are moving. The television cameras are connected to remotely located monitoring screens (not shown) position proximate the remote control unit 18. When a particular scene presents itself to an operator such that he desires to more closely observe the scene, he pushes selector switch 20 to the appropriate terminal to energize the relay coil 90. The energization of relay coil 90 causes the armature of the switch 68 to connect terminal 73, thus disabling the reversing switch 72 and de-energizing the electric motor. The operator may then depress switch 125 or switch 126 to thereby energize relay coil 91 or 92 respectively. The energization of these coils causes the energization of motor winding 65 or 64 respectively to result in the rotation of the electric motor and the surveillance unit in a desired direction. When the desired observation by the operator has been completed, the selector switch may be placed on another unit or the remote control unit may simply be switched off by opening the switch 108. The de-energization of the relay coil 90 causes the switch 68 to re-energize the motor reversing switch 72 and the surveillance unit then operates automatically by rotating first one way and then the other direction a substantially 360° arc. The potential shoplifter is attracted to the surveillance unit by the intermittently energized indicator lamps and observes that the surveillance unit is slowly rotating. Inspection of the unit reveals to the potential shoplifter that the surveillance unit includes up to nine television cameras (when in fact the unit can contain any number or even no camera at all). In the dummy surveillance units, the appearance is the same and to simulate operation of an operator as with the camera-carrying units, the program stop subsystem 20 intermittently stops the unit as if an operator were more closely observing a particular area.

The system has been found to be not only effective in observing and apprehending shoplifters, but also in preventing potential shoplifters from committing such acts. The general appearance of the system in operation has the effect of conveying a feeling of constant observation. It will be apparent to those skilled in the art that many modifications may be made in the size, shape and specific configuration of the surveillance unit; it will be also apparent to those skilled in the art that substantial modifications may be made in the specific circuitry used in the present system without departing from the concepts and teachings thereof. For example, the program stop subsystem may be chosen from a very large variety of commercially available intermittent switch operating devices. It is, therefore, intended that the present invention be limited only by the scope of the claim appended hereto.

What is claimed is:

1. An anti-shoplifting and surveillance system comprising: a plurality of observation units, at least one of said observation units including an operating closed circuit television camera and at least one of said observation units provided with no camera, each of said observation units comprising a support shaft and a housing rotatably supported thereon, said housing having a plurality of apertures therein, a reversible electric motor mounted in and fixed to said housing and means for transmitting torque from an output shaft of said electric motor to said support shaft for causing said housing to rotate about said support shaft when said motor is energized, a motor reversing switch responsive to the rotation of said housing for reversing the direction of rotation of said electric motor at least once for each full rotation of said housing about said support shaft; said system further including a remote control unit coupled to each of said observation units, said remote control unit having a selector switch for de-energizing said electric motor and disabling said motor reversing switch of a selected one of said observation units and a pair of switches for energizing said electric motor of said selected one of said observation units in the forward and reverse directions respectively when said reversing switch of said selected one of said observation units is disabled; said system further including a remote program stop subsystem connected to said observation units for selectively temporarily de-energizing said motors of said units in accordance with a predetermined program; and each of said observation units further including a plurality of indicator lamps on the exterior of said housing and means for intermittently energizing said indicator lamps whereby attention is attracted to said observation units.

References Cited

UNITED STATES PATENTS

| | | | |
|---|---|---|---|
| 3,120,160 | 2/1964 | Hammer | 95—15 |
| D. 203,678 | 2/1966 | Newton | D61—1 |
| D. 203,597 | 2/1966 | Newton | D61—1 |

OTHER REFERENCES

Closed Circuit Television Systems, Color and Monochrome, pp. 183, 185, 205, 206, Copyright 1958, RCA Service Company.

RICHARD MURRAY, Primary Examiner

D. E. STOUT, Assistant Examiner

U.S. Cl. X.R.

61—1; 95—15; 178—7.81